United States Patent [19]
Primrose

[11] 3,943,900
[45] Mar. 16, 1976

[54] MODIFICATION FOR INTERNAL COMBUSTION ENGINE PROVIDING IMPROVED FUEL ECONOMY

[76] Inventor: Ulyuss Lee Primrose, Rte. 1, Box 265, Liberty, Tex. 77575

[22] Filed: June 17, 1974

[21] Appl. No.: 479,641

[52] U.S. Cl............ 123/124 R; 123/119 D; 123/141
[51] Int. Cl.²........................................ F02H 23/00
[58] Field of Search......... 123/141, 119 D, 119 DB, 123/124 R; 261/141, 78 R, 76, DIG. 39, 65

[56] References Cited
UNITED STATES PATENTS

| | | | |
|---|---|---|---|
| 1,457,403 | 6/1923 | Snagg............................ | 123/119 DB |
| 1,597,781 | 8/1926 | Frizell............................. | 123/119 D |
| 1,716,074 | 6/1929 | Martin............................ | 123/119 D |
| 1,969,814 | 8/1934 | Meyer........................ | 123/119 DB X |
| 2,789,796 | 4/1957 | Mansfield.................... | 123/119 D X |
| 3,301,539 | 1/1967 | Antonsen...................... | 123/119 DB |
| 3,564,580 | 2/1971 | Cinque............................ | 123/119 D |

*Primary Examiner*—Charles J. Myhre
*Assistant Examiner*—Ira S. Lazarus

[57] ABSTRACT

For use with an internal combustion engine, typically the multi-cylinder variety, an apparatus which cooperates with the carburator and air intake manifold, which incorporates a flat plate-like member having appropriate passages enabling it to be bolted to an intake manifold below a carburator. The carburator mixes vaporized liquid fuel and air to provide a combustable mixture. The apparatus injects air at a point well within the intake manifold to enable the mixture of air injected thereat to disperse in the manifold air stream and flow to the cylinders of the engine for combustion. Air injected at this point is beneficial in improving fuel performance of the internal combustion engine. All other factors remaining equal, it provides better fuel economy.

1 Claim, 2 Drawing Figures

MODIFICATION FOR INTERNAL COMBUSTION ENGINE PROVIDING IMPROVED FUEL ECONOMY

PRIOR ART

U.S. Pat. Nos.:

| | |
|---|---|
| 2,119,927 | 1,002,670 |
| 2,783,891 | 2,701,557 |
| 3,077,391 | |

BACKGROUND OF THE INVENTION

The apparatus of the present invention is intended to provide improved fuel economy for vehicles. Large internal combustion engines have not been constructed with a view of optimum fuel economy. It is particular adapted for attachment to an older engine. Internal combustion engines of the sort constructed with a multi-barrel carburetor opening into an intake manifold are of particular interest. In the ordinary internal combustion engine, the cylinders are arranged in banks of four each. An intake manifold sits centered on top of the engine. The intake manifold is a conduit extending to the intake valves of the several cylinders. It is a device adapted to deliver combustible air and fuel mixture to the cylinders flowing under vacuum pull as a result of the recirocating motion of the cylinders. The passages enable flow to one cylinder to be interrupted when that valve closes and the flow diverted to another cylinder. This is advantageous.

A central cavity or chamber in the intake manifold is constructed. This cavity or chamber communicates with branches which extend to the individual cylinder intake valves. In the customary construction of such an engine, a carburetor is attached to the top side of the manifold. Carburetors customarily have either two or four barrels, which are individual carburetor mechanisms duplicated to attain better mixing and more even distribution. Each barrel incorporates a downwardly directed venturi communicated at the upper end with a common air cleaner and having carburetor jets therein. Small and middle sized engines normally have two barrels while larger engines are typically constructed with four barrel carburetors. The apparatus of the present invention is adapted to be an add-on device for pre-existing engines having a multi-barrel carburetor communicated with an intake manifold. The apparatus of the present invention is particularly easy to install. Customarily, a carburetor is bolted to the top side of the manifold by bolts which extend thereabove. The carburetor is equipped with a flange plate having four bolt holes arranged at the corners. The present invention is inserted between the carburetor and the manifold with gaskets above and below. It includes air inlet tubes positioned well below the opening of the manifold so that air is injected directly into the manifold passages.

SUMMARY OF THE INVENTION

The present invention is an attachment for an internal combustion engine equipped with a multi-passage intake manifold and a carburetor which is customarily bolted to the top side of the intake manifold. The two are temporarily separated, and the apparatus is placed between them. It comprises a generally thin and flat plate-like member having holes or passages matching those of the carburetor and intake manifold.

The flat plate-like member is joined between the carburetor and the intake manifold, preferably joined to both of them by appropriately shaped gaskets. The bolts preferably extend upwardly from the manifold through matching holes in the plate and through a flange on the carburetor. This enables the members to be joined together to define leak-proof passages extending downwardly through the carburetor through the apparatus of the present invention and into the intake manifold. A mixture of fuel and air flows through the passages into the intake manifold. The present invention has a separate tubing member which extends from an air intake remote from the apparatus to a point in the intake manifold. The air passages preferably extend downwardly and terminate in a T-shaped tubing member well within the intake manifold.

DESCRIPTION OF THE PREFERRED EMBODIMENT

Figure 1:
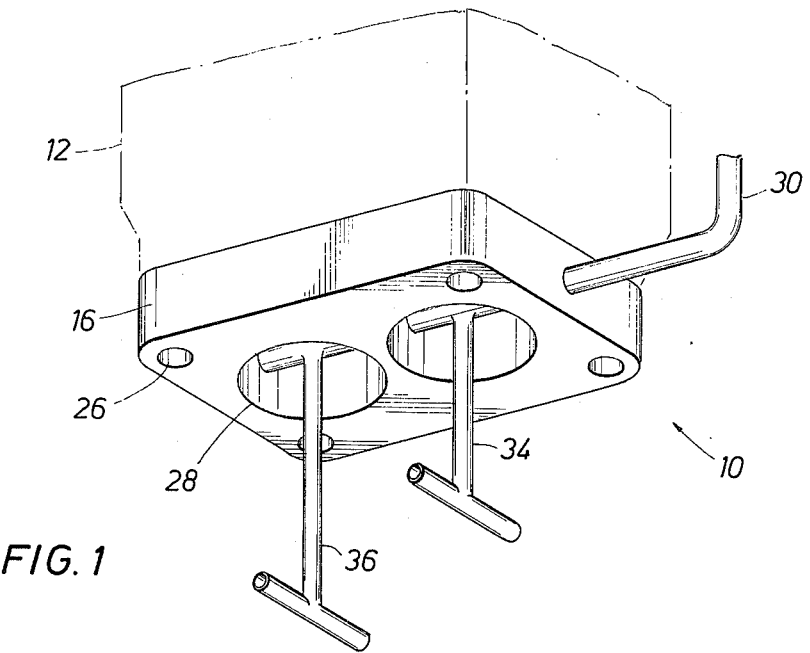
FIG. 1 is a perspective view of the carburetor adaptor of the present invention showing details of construction; and, FIG. 2 is a sectional view through the apparatus of FIG. 1 showing the equipment installed between a carburetor and intake manifold, and particularly illustrating T-shaped tubes extending downwardly into the intake manifold for delivering fresh air thereat.

Attention is first directed to FIG. 1 which shows the present invention at 10. It is adapted to be connected below a carburetor 12 and above an intake manifold 14 shown in FIG. 2. The carburetor 12 is typically a two or four barrel carburetor of conventional construction. The intake manifold 14 is typically the type of manifold found on a regularly constructed and manufactured automotive engine such as a typical straight six or V-8 engine. The apparatus incorporates a generally rectangular flat body 16 which has an upper face 20 and a lower face 22. They are preferably parallel and spaced from one another. The flat body 16 is relatively thin, and needs only to be thick enough to accommodate the tubing to be described. The flat body 16 has an exterior contour matching the bottom flange on the carburetor 12. It is shaped and constructed to match or abut the flange in joining the two together, preferably with a gasket 24 positioned therebetween. The gasket 24 provides a leak-proof seal.

The body 16 has bolt holes 26 at locations matching those found in the bottom flange of the carburetor. It is intended to be interposed between the intake manifold 14 below the flange and carburetor 12. The holes 26 preferably match in location and diameter. They do not need to be threaded because the customary mode of construction is to utilize threaded bolts which engage threaded nuts above the flange.

The flat body 16 further incorporates larger openings 28. Two are shown in the illustrated embodiment although four can be provided. The large holes 28 match the venturi passages or throats of the carburetor 12. This permits streamlined air flow from the carburetor to the manifold 14. The carburetor may be equipped with two or four throats, and the plate 16 is provided with two or four matching holes or passages through it.

Figure 2:
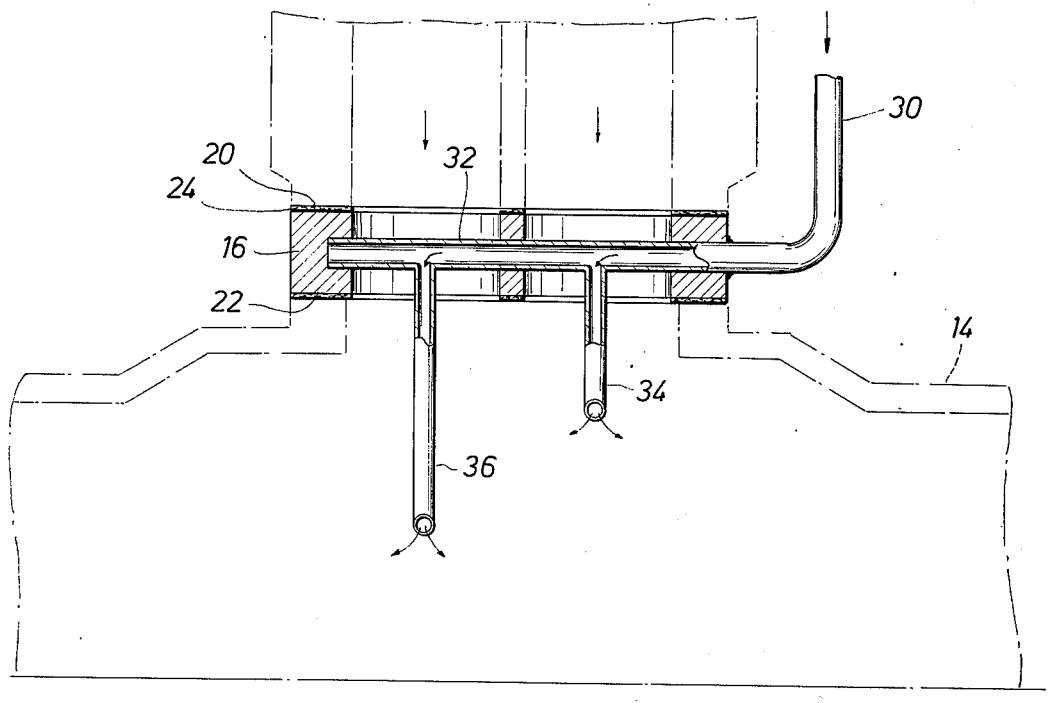

In FIG. 2, a tubing 30 is open at one end. If desired, an air cleaner can be placed over the open end. In ordinary circumstances, the air volume through the tubing 30 is reasonably small and it is not particularly necessary to incorporate an air cleaner. The device can be readily equipped with flapper valves, such as a butterfly valve, which can be selectively opened or closed. This is optional, however, and the apparatus is routinely used at all times so that the tubing 30 is open at its upper end. The end of the tubing 30 can be located relatively close or far from the carburator 12. Precise location is not critical.

The tubing 30 passes through one side wall of the plate 16. The tubing has an ID in the range of about one-eighth to about one-quarter inch. The size of the tubing is dependent on the size of the engine. The tubing 30 passes through the side wall of the plate 16. The plate 16 needs only be slightly taller than the tubing. The thickness illustrated in FIG. 2 has been exaggerated vertically for purposes of illustration. The plate 16 can have a height just slightly greater than the diameter of the tubing. The tubing is customarily circular although it can be rectangular in cross section.

A horizontal portion 32 of the tubing terminates at a dead end. The tubing 32 connects with multiple branches. It connects with a first downwardly directed tee 34 and a second downwardly directed tee 36. The first tee is positioned in one carburator throat and the other is positioned in the other carburator throat. They begin within the carburator throats, but extend to a point below the carburator and on the interior of the intake manifold. They support transverse cross members which are opened at the exposed ends. This introduces fresh air which is drawn by vacuum flow into manifold 14. Air which is introduced into the manifold at this point is picked up by the flow of air and fuel mixture and provides a leaning of the mixture, thereby providing better combustion. The tee 34 is shorter than the tee 36. This variation places streams of air at the center location in the stratified air flow patterns established in the carburator, particularly at higher speeds. The apparently laminar flow carries the fresh air along to the cylinders.

In the event the apparatus of the present invention is used with a four-throat carburator, the horizontal branch 32 is preferably duplicated and the several tees are likewise duplicated so that one tee is positioned in each and every throat. They are not precisely in the throat, but are aligned with the carburator throat and are below it. The tees should extend to about the center of the manifold passages.

The tubing 32 and the tees 34 and 36 are preferably formed of the same diameter stock, approximating one-eighth to one-quarter inch ID. Preferably metal stock is used to maintain structural integrity.

The apparatus of the present invention provides measurable improvement. At low RPM situations, the intake manifold draws a substantial vacuum. The air flow is very substantial in comparison with the flow of air through the carburator itself. This provides leaning at low RPM situations. At high RPM situations, more air is introduced through the carburator 12. In these circumstances, the air flow through the tube 30 is limited, and even tends to be reduced somewhat because the pressure in the intake manifold is measurably reduced. At higher engine speeds, the mixture is typically lean enough for the circumstances and the relative percentage of air introduced with the fuel through the carburator is normally found adequate.

The foregoing is directed to the preferred embodiment of the present invention. The scope is determined by the claims which follow.

I claim:

1. An attachment in combination with an internal combustion engine, said attachment installed between a carburetor and an intake manifold of said internal combustion engine, said carburetor is equipped with a throat of specified diameter and said intake manifold has a mating opening to said carburetor, wherein an air-fuel mixture is delivered from said carburetor through said attachment to said intake manifold for distribution of said air fuel mixture through a number of passage means within said intake manifold to cylinders for combustion, said attachment comprising: a generally flat body with upper and lower parallel faces with passages therethrough which align with the throat of said carburetor and the mating opening of said intake manifold; a first seal, sealingly connecting the upper face of the attachment to a flanged bottom plate of said carburetor and a second seal, sealingly connecting the lower face of said attachment to a mating surface on said intake manifold; and including a tube which continuously injects fresh air into the intake manifold and is open to the atmosphere at one end and passes through a side wall of said attachment and transversely extends across the passages of said attachment and dead ends in one of said passages; said tube further comprises a downwardly directed tee shaped section for each passage, the vertical section of each tee shaped section being connected to that portion of the tube which extends transversely across each passage at the approximate center of each passage, said tee shaped section having a pair of spaced openings at opposite ends of said tee shaped section cross arm and wherein said tee shaped section extends from said attachment to a point within the passage means of said intake manifold.

* * * * *